US011483053B2

(12) United States Patent
Kapetanovic

(10) Patent No.: US 11,483,053 B2
(45) Date of Patent: Oct. 25, 2022

(54) APPROACHES FOR BEAM SELECTION

(71) Applicant: Telefonaktiebolaget LM Ericsson (publ), Stockholm (SE)

(72) Inventor: Dzevdan Kapetanovic, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 552 days.

(21) Appl. No.: 16/080,517

(22) PCT Filed: Jun. 1, 2018

(86) PCT No.: PCT/EP2018/064529
§ 371 (c)(1),
(2) Date: Aug. 28, 2018

(87) PCT Pub. No.: WO2019/228652
PCT Pub. Date: Dec. 5, 2019

(65) Prior Publication Data
US 2021/0203398 A1 Jul. 1, 2021

(51) Int. Cl.
*H04B 7/08* (2006.01)
*H04B 7/06* (2006.01)
*H04W 24/10* (2009.01)

(52) U.S. Cl.
CPC ........... *H04B 7/088* (2013.01); *H04B 7/0617* (2013.01); *H04B 7/0639* (2013.01); *H04W 24/10* (2013.01)

(58) Field of Classification Search
CPC .... H04W 72/042; H04W 76/27; H04L 5/0053
(Continued)

(56) References Cited

U.S. PATENT DOCUMENTS

2006/0279460 A1* 12/2006 Yun ...................... H01Q 3/2605
342/377
2007/0049218 A1* 3/2007 Gorokhov ................ H04L 1/06
455/102
(Continued)

FOREIGN PATENT DOCUMENTS

EP 1062746 A2 12/2000
EP 1631100 A1 3/2006
(Continued)

OTHER PUBLICATIONS

PCT International Search Report, dated Aug. 6, 2019, in connection with International Application No. PCT/EP2018/083166, all pages.
(Continued)

*Primary Examiner* — Sam K Ahn
*Assistant Examiner* — Gina M McKie
(74) *Attorney, Agent, or Firm* — Leffler Intellectual Property Law, PLLC

(57) ABSTRACT

A method is disclosed for a transmitter apparatus configured to transmit signals to a receiver apparatus using a beam selected from a plurality of available beams, wherein a set of the plurality of available beams is for beam selection measurements by the receiver apparatus. The method comprises determining a collection of linear combinations of beams of the set, wherein the cardinality of the collection is lower than a cardinality of the set, and transmitting each of the linear combinations of beams for beam selection measurements by the receiver apparatus. A method is also disclosed for a receiver apparatus configured to receive signals from a transmitter apparatus via a beam selected from a plurality of available beams. The method comprises receiving a number of measurement signals for beam selection measurements from the transmitter apparatus, wherein the number of measurement signals correspond to a collection of linear combinations of beams of a set of the plurality (Continued)

of available beams, wherein the cardinality of the collection is lower than a cardinality of the set, and performing beam selection measurements on the number of measurement signals for selection of the beam from the plurality of available beams. Corresponding transmitter apparatus, receiver apparatus, network node, wireless communication device and computer program products are also disclosed.

22 Claims, 2 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2008/0232501 A1* | 9/2008 | Khojastepour | H04B 7/0641 375/267 |
| 2010/0150266 A1* | 6/2010 | Mondal | H04B 7/0639 375/296 |
| 2014/0187168 A1 | 7/2014 | Seol et al. | |
| 2015/0311971 A1* | 10/2015 | Learned | H04B 7/086 370/329 |
| 2016/0127919 A1 | 5/2016 | Hui et al. | |
| 2016/0142117 A1* | 5/2016 | Rahman | H04B 7/0486 375/267 |
| 2018/0049042 A1 | 2/2018 | Yu et al. | |
| 2018/0131486 A1* | 5/2018 | Liu | H04B 7/0695 |

FOREIGN PATENT DOCUMENTS

| | | |
|---|---|---|
| EP | 3316493 A1 | 5/2018 |
| WO | 9914780 A2 | 3/1999 |
| WO | 2009003423 A1 | 1/2009 |

OTHER PUBLICATIONS

PCT Written Opinion, dated Aug. 6, 2019, in connection with International Application No. PCT/EP2018/083166, all pages.
3GPP TSG RAN WG1 Vice Chairman (Samsung): "NR Physical Layer Design: NR MIMO", 3GPP RAN Workshop on 3GPP submission towards IMT-2020, Brussels, Belgium, Oct. 24-25, 2018, pp. 1-23.
PCT International Search Report, dated Feb. 25, 2019, in connection with International Application No. PCT/EP2018/064529, all pages.
PCT Written Opinion, dated Feb. 25, 2019, in connection with International Application No. PCT/EP2018/064529, all pages.
PCT International Search Report, dated Apr. 1, 2020, in connection with International Application No. PCT/EP2019/072214, all pages.
PCT Written Opinion, dated Apr. 1, 2020, in connection with International Application No. PCT/EP2019/072214, all pages.
Yu Zhang et al., "Channel Estimation and Hybrid Precoding for Distributed Phased Arrays Based MIMO Wireless Communications", Arxiv.org, Cornell University Library, Mar. 14, 2019, pp. 1-30.
Liang Zhou et al., "Fast Codebook-Based Beamforming Training for mmWave MIMO Systems with Subarray Structures", 2015 IEEE 82nd Vehicular Technology Conference, Sep. 6, 2015, pp. 1-5.
Didi Zhang et al., "Millimeter Wave Channel Estimation Based on Subspace Fitting", IEEE Access, vol. 6, Nov. 30, 2018, pp. 76126-76139.

* cited by examiner

APPROACHES FOR BEAM SELECTION

TECHNICAL FIELD

The present disclosure relates generally to the field of wireless communication. More particularly, it relates to approaches for beam selection in relation to beam forming applied in wireless communication.

BACKGROUND

In wireless communication standards that rely on beam-forming (e.g., fifth generation (5G), new radio (NR), IEEE 802.11ay, etc.), an important procedure for the base station (BS) is to find the best (or at least a good enough) beam towards each user equipment (UE) that it serves. This is usually achieved by some type of training transmissions (also referred to as beam training or beam sweeping).

One straightforward way to implement such a procedure (which is used in IEEE 802.11ac, for example) is to let the BS transmit orthogonal beams, and let the UE estimate the downlink (DL) channel and/or received signal-to-noise ratio (SNR) based on the transmission. Then the UE can send reports to the BS indicative of the estimation and/or a desired beam selection determined based on the estimation.

The number of orthogonal beams that must be transmitted in such an implementation equals the number of antennas (or antenna elements) at the BS. Thus, this approach may be useful when there is a low or moderate number of antenna element. However, for situations with a large number of antenna elements (e.g., massive multiple-input multiple-output (MIMO)), the number of beams that need to be transmitted becomes equally large which makes this approach cumbersome. For example, a substantial amount of time may need to be allocated for the training transmissions and the training transmissions contribute with a large amount of overhead signaling, both of which may impair system capacity.

In such situations, the BS may instead transmit a lower number of beams than in the implementation referred to above. Even in this approach, however, the amount of time and/or signaling overhead of the training transmissions may be substantial.

Therefore, there is a need for more efficient approaches for beam selection. Preferably, such approaches require less time allocation and/or less signaling overhead than other approaches. Also preferable, such approaches achieve the same or improved results concerning optimum beam selection (e.g., received SNR of the selected beam). If approaches achieve deteriorated results concerning optimum beam selection, it is preferable that the deterioration is minimal, or at least not substantial.

SUMMARY

It should be emphasized that the term "comprises comprising" when used in this specification is taken to specify the presence of stated features, integers, steps, or components, but does not preclude the presence or addition of one or more other features, integers, steps, components or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a method for a transmitter apparatus configured to transmit signals to a receiver apparatus using a beam selected from a plurality of available beams, wherein a set of the plurality of available beams is for beam selection measurements by the receiver apparatus.

The method comprises determining a collection of linear combinations of beams of the set, wherein the cardinality of the collection is lower than a cardinality of the set, and transmitting each of the linear combinations of beams for beam selection measurements by the receiver apparatus.

In some embodiments, the method further comprises receiving a beam selection measurement report from the receiver apparatus, and selecting the beam from the plurality of available beams in accordance with the received beam selection measurement report.

In some embodiments at least one of the linear combinations is a linear combination of at least two of the beams of the set.

In some embodiments, each of the linear combinations is a unique linear combination of all of the beams of the set.

In some embodiments, the collection of linear combinations is defined by an approximately optimal Grassmannian coding matrix.

In some embodiments, the set of the plurality of available beams consists of a minimum number of beams spanning the plurality of available beams.

In some embodiments, the set of the plurality of available beams comprises discrete Fourier transform (DFT) beams, wherein a beam direction of any beam in the set corresponds to a harmonic frequency.

In some embodiments, transmitting comprises transmitting each of the linear combinations of beams in a respective transmission time resource, the respective time resources being different.

A second aspect is a method for a receiver apparatus configured to receive signals from a transmitter apparatus via a beam selected from a plurality of available beams.

The method comprises receiving a number of measurement signals for beam selection measurements from the transmitter apparatus, wherein the number of measurement signals correspond to a collection of linear combinations of beams of a set of the plurality of available beams, wherein the cardinality of the collection is lower than a cardinality of the set, and performing beam selection measurements on the number of measurement signals for selection of the beam from the plurality of available beams.

In some embodiments, the method further comprises transmitting a beam selection measurement report to the transmitter apparatus for selection of the beam from the plurality of available beams.

In some embodiments, performing beam selection measurements comprises determining a quality metric for each of the beams of the set based on the beam selection measurements.

In some embodiments, performing beam selection measurements comprises subjecting the number of received measurement signals to matched filtering based on the collection of linear combinations.

A third aspect is a computer program product comprising a non-transitory computer readable medium, having thereon a computer program comprising program instructions. The computer program is loadable into a data processing unit and configured to cause execution of the method according to any of the first and second aspects when the computer program is run by the data processing unit.

A fourth aspect is a transmitter apparatus configured to transmit signals to a receiver apparatus using a beam selected from a plurality of available beams, wherein a set of the plurality of available beams is for beam selection measurements by the receiver apparatus.

The apparatus comprises controlling circuitry configured to cause determination of a collection of linear combinations of beams of the set, wherein the cardinality of the collection is lower than a cardinality of the set and transmission of each of the linear combinations of beams for beam selection measurements by the receiver apparatus.

A fifth aspect is a receiver apparatus configured to receive signals from a transmitter apparatus via a beam selected from a plurality of available beams.

The apparatus comprises controlling circuitry configured to cause reception of a number of measurement signals for beam selection measurements from the transmitter apparatus, wherein the number of measurement signals correspond to a collection of linear combinations of beams of a set of the plurality of available beams, wherein the cardinality of the collection is lower than a cardinality of the set, and performance of beam selection measurements on the number of measurement signals for selection of the beam from the plurality of available beams.

A sixth aspect is a network node comprising the transmitter apparatus of the fourth aspect and/or the receiver apparatus of the fifth aspect.

A seventh aspect is a wireless communication device comprising the transmitter apparatus of the fourth aspect and/or the receiver apparatus of the fifth aspect.

In some embodiments, any of the above aspects may additionally have features identical with or corresponding to any of the various features as explained above for any of the other aspects.

An advantage of some embodiments is that alternative approaches for beam selection are provided.

The alternative approaches may, in some embodiments, be more efficient than other approaches for beam selection.

The alternative approaches may, in some embodiments, require less time allocation and/or less signaling overhead than other approaches for beam selection.

The alternative approaches may, in some embodiments, achieve results concerning optimum beam selection (e.g., received SNR of the selected beam) that is not severely deteriorated compared to other approaches for beam selection.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where alternative approaches for beam selection are provided.

Figure 1:
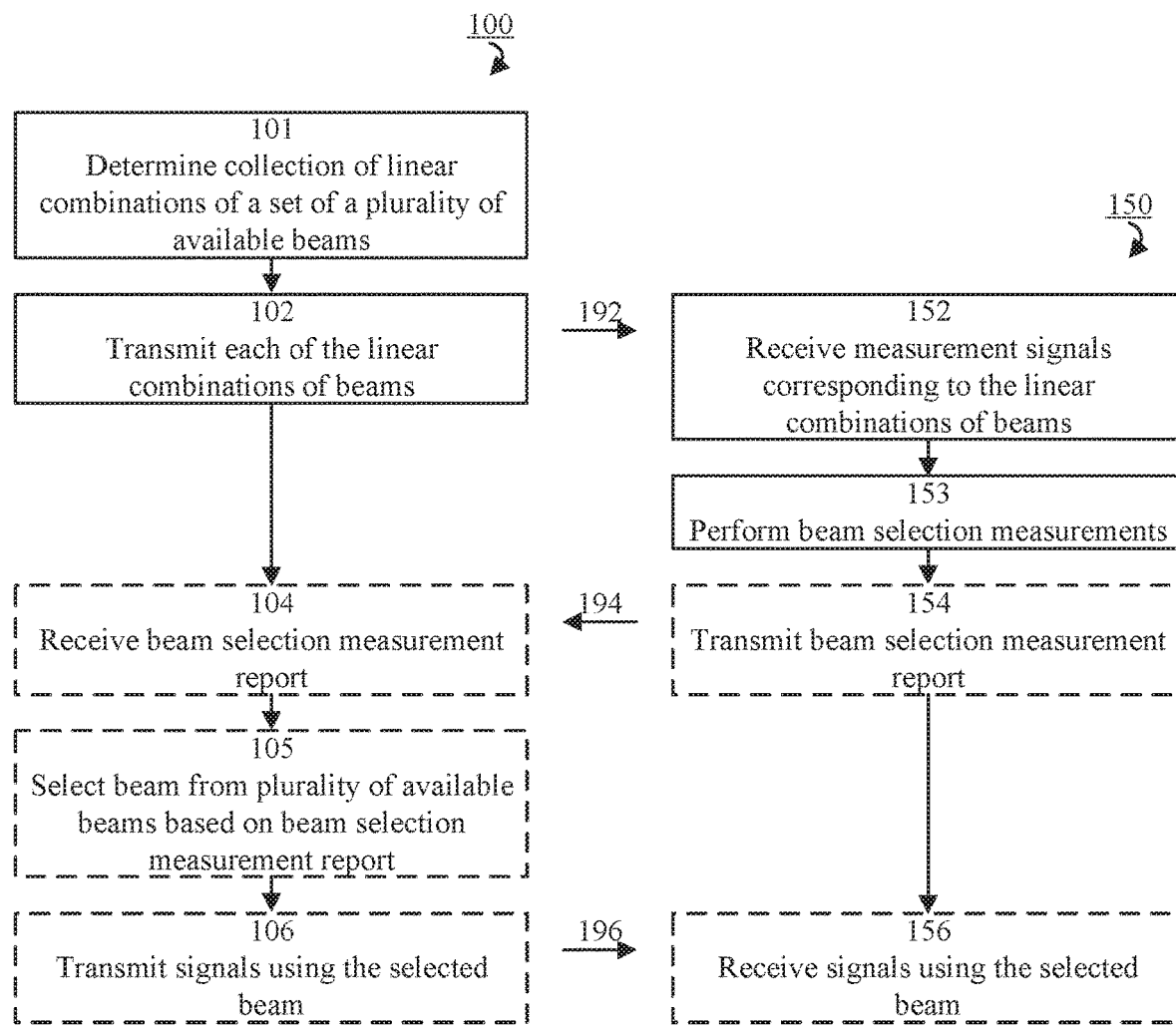
FIG. 1 is a combined flowchart and signaling diagram illustrating example method steps and signaling according to some embodiments.

FIG. 1 is a combined flowchart and signaling diagram illustrating example methods 100 and 150 and example signaling according to some embodiments. The example method 100 is for a transmitter apparatus configured to transmit signals to a receiver apparatus using a beam selected from a plurality of available beams and the method 150 is for a receiver apparatus configured to receive signals from a transmitter apparatus via a beam selected from a plurality of available beams. Typically, the plurality of available beams may comprise all possible beams for transmission from the transmitter apparatus.

A set of the plurality of available beams is for beam selection measurements by the receiver apparatus. Thus, this set is the set of beams used for beam training. The set may comprise all beams in the plurality of available beams or a subset of the plurality of available beams. In some embodiments, the beams of the set are orthogonal, but this is not necessarily true for all embodiments. In some embodiments, the beams of the set span a space where all of the beams of the plurality of available beams reside. Typically, the set of beams consists of a minimum number of beams spanning the plurality of available beams (i.e., the space where all of the beams of the plurality of available beams reside).

The set of the plurality of available beams may, for example, comprise discrete Fourier transform (UFT) beams, wherein a beam direction of any beam in the set corresponds to a harmonic frequency. DFT beams can be constructed to span the whole antenna space (e.g., by choosing harmonic frequencies of the DFT as angles for the beams), and they have constant amplitude on each antenna (which is desirable from a power amplifier (PA) point of view).

Moreover, the channel itself can typically be expressed as a weighted combination of DFT beams with different angles. Due to this channel decomposition property, some DFT beams are expected to be well aligned with the channel, which makes them attractive from the perspective herein.

Transmitting, for training purposes, all of the beams in the plurality of available beams or the beams of the set may correspond to the approaches referred to in the background section. In the following, techniques will be exemplified for reducing the number of beams transmitted for training purposes without substantial loss in performance of the selected beam.

In step 101, a collection of linear combinations of beams of the set of beams is determined. The cardinality of the collection is lower than the cardinality of the set. The cardinality of the collection is also larger than one.

At least one of the linear combinations is a linear combination of at least two of the beams of the set. Thus, the linear combination is not an identity function.

In typical embodiments, each of the linear combinations is a unique linear combination.

Also typically, in some embodiments, each of the linear combinations is a linear combination of all of the beams of the set.

The collection of linear combinations may, for example, be defined by an approximately optimal Grassmannian coding matrix. Thus, the collection of linear combinations may be defined by an N×K matrix with columns equal to K vectors from a complex Grassmannian line packing problem in N dimensions; each column corresponding to an approximately optimal Grassmannian frame.

Generally, any other suitable coding matrices may be used to define the collection of linear combinations.

In step 102, each of the linear combinations of beams is transmitted for beam selection measurements by the receiver apparatus, as illustrated by signaling 192. In typical embodiments, each of the linear combinations of beams is transmitted in a respective transmission time resource, the respective time resources being different (from each other), i.e., one linear combination of beams is transmitted at a time.

In step 152 of the example method 150, measurement signals 192 are received, corresponding to the linear combinations of beams (e.g., the transmitted linear combinations as effected by the channel).

Thus, in step 152, a number of measurement signals for beam selection measurements are received from the transmitter apparatus, wherein the number of measurement signals correspond to a collection of linear combinations of beams of a set of the plurality of available beams, wherein the cardinality of the collection is lower than a cardinality of the set.

Beam selection measurements are performed, in step 153, on the number of measurement signals for selection of the beam from the plurality of available beams. Such measurements may be according to any suitable approach. For example, performing beam selection measurements may comprise determining a quality metric (e.g., signal strength, SNR, etc.) for each of the beams of the set based on the beam selection measurements. Alternatively or additionally, performing beam selection measurements may comprise subjecting the number of received measurement signals to matched filtering, or minimum mean square error (MMSE) processing, based on the collection of linear combinations.

Optionally, a beam selection measurement report 194 is transmitted to the transmitter apparatus in step 154, for selection of the beam from the plurality of available beams, and received in step 104. The report may be indicative of the selection measurement results (e.g. the quality metric) of the best beam, of a number of best beams, or of all beams; or of a preferred beam, or beams, determined by the receiver apparatus based on the selection measurement results (e.g., by indicating an index of each preferred beam), or both.

In optional step 105, the transmitter apparatus selects the beam (to be used for transmission to the receiver apparatus) from the plurality of available beams in accordance with the received beam selection measurement report. The selection may be performed using any suitable approach. For example, the selection may be based on selection measurement results according to some embodiments. In another example, the selection merely comprises accepting the preferred beam indicated in the selection measurement report.

Once selected, the beam is used in optional step 106 to transmit signals 196 to the receiving apparatus, which signals are received in optional step 156.

Figure 2:
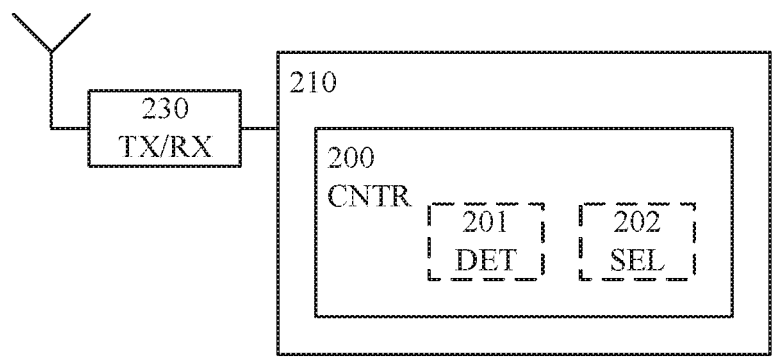
FIG. 2 is a schematic block diagram illustrating an example apparatus according to some embodiments.

FIG. 2 schematically illustrates an example transmitter apparatus 210 according to some embodiments. The transmitter apparatus is configured to transmit signals to a receiver apparatus using a beam selected from a plurality of available beams, wherein a set of the plurality of available beams is for beam selection measurements by the receiver apparatus. For example, the transmitter apparatus may be configured to perform (or cause performance of) one or more of the steps described in connection with the method 100 of FIG. 1. The transmitter apparatus of FIG. 2 may be comprised in a network node and/or a wireless communication device, for example.

The apparatus comprises controlling circuitry (e.g. a controller, CNTR) 200 configured to cause determination of a collection of linear combinations of beams of the set, wherein the cardinality of the collection is lower than a cardinality of the set, and transmission of each of the linear combinations of beams for beam selection measurements by the receiver apparatus. The controlling circuitry may be configured to cause transmission of each of the linear combinations of beams in a respective transmission time resource, the respective time resources being different.

The controlling circuitry may also be further configured to cause reception of a beam selection measurement report from the receiver apparatus, and selection of the beam from the plurality of available beams in accordance with the received beam selection measurement report.

To this end, the controlling circuitry may comprise, or be otherwise associated with one or more of determination circuitry (e.g., a determiner, DET) 201, selection circuitry (e.g., a selector, SEL) 202, receiving circuitry (e.g., a receiver, RX) 230, and transmitting circuitry (e.g., a transmitter, TX) 230.

The determiner 201 may be configured to determine the collection of linear combinations of beams of the set. The transmitter 230 may be configured to transmit each of the linear combinations of beams for beam selection measurements by the receiver apparatus. The receiver 230 may be configured to receive the beam selection measurement report. The selector 202 may be configured to select the beam from the plurality of available beams in accordance with the received beam selection measurement report.

Figure 3:
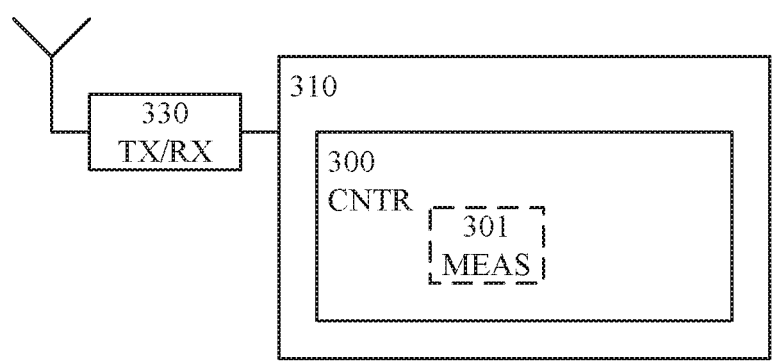
FIG. 3 is a schematic block diagram illustrating an example apparatus according to some embodiments.

FIG. 3 schematically illustrates an example receiver apparatus 310 according to some embodiments. The receiver apparatus is configured to receive signals from a transmitter apparatus via a beam selected from a plurality of available beams. For example, the receiver apparatus may be configured to perform (or cause performance of) one or more of the steps described in connection with the method 150 of FIG. 1. The receiver apparatus of FIG. 3 may be comprised in a network node and/or a wireless communication device, for example.

The apparatus comprises controlling circuitry (e.g. a controller, CNTR) 300 configured to cause reception of a number of measurement signals for beam selection measurements from the transmitter apparatus, wherein the number of measurement signals correspond to a collection of linear combinations of beams of a set of the plurality of available beams, wherein the cardinality of the collection is lower than a cardinality of the set.

The controlling circuitry is also configured to cause performance of beam selection measurements on the number of measurement signals for selection of the beam from the plurality of available beams. For example, the controlling circuitry may be configured to cause performance of beam selection measurements by causing determination of a quality metric for each of the beams of the set based on the beam selection measurements. Alternatively or additionally, the controlling circuitry may be configured to cause performance of beam selection measurements by causing subjection of the number of received measurement signals to matched filtering, or minimum mean square error (MMSE) processing, based on the collection of linear combinations.

The controlling circuitry may also be further configured to cause transmission of a beam selection measurement report to the transmitter apparatus for selection of the beam from the plurality of available beams.

To this end, the controlling circuitry may comprise, or be otherwise associated with one or more of measuring circuitry (e.g., a measurer, MEAS) 301, receiving circuitry (e.g., a receiver, RX) 330, and transmitting circuitry (e.g., a transmitter, TX) 330.

The receiver 30 may be configured to receive the number of measurement signals for beam selection measurements from the transmitter apparatus. The measurer 301 may be configured to perform the beam selection measurements. The transmitter may be configured to transmit the beam selection measurement report.

Thus, according to some embodiments, beam coding for reducing overhead of beam training is provided. A coding of the original beams (the beams of the set) is formulated such that the number of coded beams are (significantly) less than the number of original beams, wherein the coded beams correspond to the linear combinations of beams. When the BS transmits the coded beams, the total transmission time becomes significantly lower than when the original beams are transmitted. The UE receives the coded beams and (in typical approaches) performs a simple operation (matched filtering (corresponding to a maximum likelihood solution), MMSE processing, or similar) to estimate which of the original beams is best, and the index of the original beam may be fed back to the BS.

An example will now be provided to illustrate the general descriptions of FIGS. 1-3. In this example, it is assumed that the BS has M antennas and the UE has a single receive antenna. This is a valid assumption in many scenarios, e.g., for the beam training according to the IEEE 802.11ay standard. In 802.11ay, the transmitter (BS) transmits different beams, while the UE selects one receive beam at a time (assuming a single radio frequency (RF) chain at the receiver) onto which it projects the received signal. The latter process makes the assumption of one single receive antenna valid for the training process, even when the receiver has several antenna elements.

A codebook $F=[f_1, \ldots, f_K]$ is considered, of beams that the BS wants to train for a certain UE (the set of beams in the wording above). As described above, these beams may be DFT beams, where each element has a constant magnitude. A goal of the training procedure may, for example, be for the BS to know which of the beams $f_1, \ldots, f_K$ provides highest received SNR at the UE.

This information may be obtained through feedback (the selection measurement report) from the UE about which of the K beams is received with highest SNR. In a simple approach, the BS may just transmit one beam at a time, let the UE estimate the received SNR for each beam, and feedback the index of the beam that resulted in largest received SNR.

If $x_i$ denotes the transmitted vector at time instant i from the BS, and $X=[x_1, \ldots, x_j]$ denotes all transmissions from time instant 1 to j (the matrix X has size M×J), transmitting one beam at a time (i.e., $x_i=f_i$) is equivalent to $X=FI$, where I, is the K×K identity matrix (i.e., J=K in this case).

By replacing the identity matrix in the above expression with another matrix B (the coding matrix defining the collection of linear combinations) of size N×K, another collection of beams to be transmitted (wherein each beam to transmit is a linear combination of beams of the original beam set) is obtained as $X=FB^T$, where $(\bullet)^T$ denotes transposition.

These beams are coded beams (the collection of linear combinations), and B acts as a code on the original set of beams in F. At each time instant, a linear combination of the beams in F is transmitted. As a result, all beams are transmitted in each time instant provided that B has no zero-valued elements.

In the coded beam case, J=N, and B should preferably be selected so that N becomes significantly smaller than K (to decrease the number of transmission) while still being able to identify (after transmission through the channel) which beam in F provides the highest received SNR at the UE.

If $h^T$ denotes the DL channel from the BS to the UE, the received symbol at the UE at time instant i may be expressed as $y_i = h^T F(B_{i,:})^T + n_i$, where $n_i$ denotes additive white Gaussian noise (AWGN) with density $N_0$ at time instant i, and $B_{i,:}$ denotes the $i^{th}$ row in B. Defining $c^T \triangleq h^T F$ as the product between channel and beams, and collecting the received symbols $y_i$ and noise samples $n_i$, i=1, . . . , N, into vectors $y=[y_1, \ldots, y_N]^T$ and $n=[n_1, \ldots, n_N]^T$, respectively, the expression for the received symbols may be written as $y=Bc+n$.

The task of the UE is to determine which element in c has the highest magnitude, corresponding to the beam in F that provides the highest received SNR at the UE when used for data transmission. A suitable decoding rule to be used at the UE for this model should output an integer $\hat{k}$ that corresponds to an estimate that the $\hat{k}^{th}$ element $c_{\hat{k}}$ in c has the highest magnitude.

One such decoding rule may be provided as follows. It can be shown that, in some scenarios, a simple matched filter (matched to the matrix B) followed by locating the element with largest magnitude achieves the maximum likelihood (ML) decoding rule for the UE optimization problem presented above;

$$\hat{k} = \arg\max_k |(B^H y)_k|,$$

where $(B^H y)_k$ is the $k^{th}$ element in the vector $B^H y$, and $(\bullet)^H$ denotes Hermitian transposition. An example of such scenarios is when $Bx_i$ and $x_i$ have similar lengths.

Thus, by application of the principles above, K beams may be trained in N transmissions from the BS, where 1<N<K due to the coding approach as opposed to prior art approaches where N=K. One possible N×K code matrix B may be achieved by selecting the columns in B as K vectors from a complex Grassmannian line packing problem in N dimensions.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally an electronic apparatus (such as a wireless communication device or a network node) may be configured to perform methods according to any of the embodiments described herein.

Figure 4:
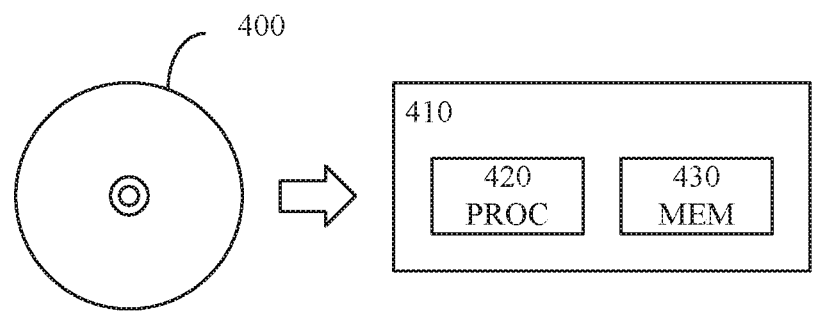
FIG. 4 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 4 illustrates an example computer readable medium in the form of a compact disc (CD) ROM 400. The computer readable medium has stored thereon a computer program comprising program instructions. The computer program is loadable into a data processor (PROC) 420, which may, for example, be comprised in a wireless communication device or a network node 410. When loaded into the data processing unit, the computer program may be stored in a memory (MEM) 430 associated with or comprised in the data-processing unit. According to some embodiments, the computer program may when loaded into and run by the data processing unit, cause execution of method steps according to, for example, any of the methods as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments and vice versa.

Hence, it should be understood that the details of the described embodiments are merely examples brought forward for illustrative purposes, and that all

The invention claimed is:

1. A method for a transmitter apparatus configured to transmit signals to a receiver apparatus using a beam selected from a plurality of available beams, wherein a set of the plurality of available beams is for beam selection measurements by the receiver apparatus, the method comprising:
   determining a collection of linear combinations of beams of the set, wherein the cardinality of the collection is lower than a cardinality of the set; and
   transmitting each of the linear combinations of beams for beam selection measurements by the receiver apparatus,
   wherein each of the linear combinations is a unique linear combination formed from nonzero contributions of all of the beams of the set.

2. The method of claim 1, further comprising:
   receiving a beam selection measurement report from the receiver apparatus; and
   selecting the beam from the plurality of available beams in accordance with the received beam selection measurement report.

3. The method of claim 1, wherein at least one of the linear combinations is a linear combination of at least two of the beams of the set.

4. The method of claim 1, wherein the collection of linear combinations is defined by an approximately optimal Grassmannian coding matrix.

5. The method of claim 1, wherein the set of the plurality of available beams consists of a minimum number of beams spanning the plurality of available beams.

6. The method of claim 1, wherein the set of the plurality of available beams comprises discrete Fourier transform, DFT, beams, wherein a beam direction of any beam in the set corresponds to a harmonic frequency.

7. The method of claim 1, wherein transmitting comprises transmitting each of the linear combinations of beams in a respective transmission time resource, the respective time resources being different.

8. The method of claim 1, wherein one or more coefficients of at least one of the linear combinations is a complex-valued number.

9. A method for a receiver apparatus configured to receive signals from a transmitter apparatus via a beam selected from a plurality of available beams, the method comprising:
   receiving a number of measurement signals for beam selection measurements from the transmitter apparatus, wherein the number of measurement signals correspond to a collection of linear combinations of beams of a set of the plurality of available beams, wherein the cardinality of the collection is lower than a cardinality of the set, wherein each of the linear combinations is a unique linear combination formed from nonzero contributions of all of the beams of the set; and
   performing beam selection measurements on the number of measurement signals for selection of the beam from the plurality of available beams.

10. The method of claim 9, further comprising:
    transmitting a beam selection measurement report to the transmitter apparatus for selection of the beam from the plurality of available beams.

11. The method of claim 9, wherein performing beam selection measurements comprises determining a quality metric for each of the beams of the set based on the beam selection measurements.

12. The method of claim 9, wherein performing beam selection measurements comprises subjecting the number of received measurement signals to matched filtering based on the collection of linear combinations.

13. A non-transitory computer readable storage medium having thereon a computer program comprising program instructions, the computer program being loadable into a data processing unit and configured to cause execution of a method when the computer program is run by the data processing unit, wherein the method is for a transmitter apparatus configured to transmit signals to a receiver apparatus using a beam selected from a plurality of available beams, wherein a set of the plurality of available beams is for beam selection measurements by the receiver apparatus, and wherein the method comprises:

determining a collection of linear combinations of beams of the set, wherein the cardinality of the collection is lower than a cardinality of the set; and transmitting each of the linear combinations of beams for beam selection measurements by the receiver apparatus, wherein each of the linear combinations is a unique linear combination formed from nonzero contributions of all of the beams of the set.

14. A transmitter apparatus configured to transmit signals to a receiver apparatus using a beam selected from a plurality of available beams, wherein a set of the plurality of available beams is for beam selection measurements by the receiver apparatus, the apparatus comprising controlling circuitry configured to cause:

determination of a collection of linear combinations of beams of the set, wherein the cardinality of the collection is lower than a cardinality of the set; and transmission of each of the linear combinations of beams for beam selection measurements by the receiver apparatus, wherein each of the linear combinations is a unique linear combination formed from nonzero contributions of all of the beams of the set.

15. The transmitter apparatus of claim 14, wherein the controlling circuitry is further configured to cause:

reception of a beam selection measurement report from the receiver apparatus; and selection of the beam from the plurality of available beams in accordance with the received beam selection measurement report.

16. The transmitter apparatus of claim 14, wherein the controlling circuitry is configured to cause transmission of each of the linear combinations of beams in a respective transmission time resource, the respective time resources being different.

17. A network node comprising the transmitter apparatus of claim 14.

18. A wireless communication device comprising the transmitter apparatus of claim 14.

19. A receiver apparatus configured to receive signals from a transmitter apparatus via a beam selected from a plurality of available beams, the apparatus comprising controlling circuitry configured to cause:

reception of a number of measurement signals for beam selection measurements from the transmitter apparatus, wherein the number of measurement signals correspond to a collection of linear combinations of beams of a set of the plurality of available beams, wherein the cardinality of the collection is lower than a cardinality of the set, wherein each of the linear combinations is a unique linear combination formed from nonzero contributions of all of the beams of the set; and performance of beam selection measurements on the number of measurement signals for selection of the beam from the plurality of available beams.

20. The receiver apparatus of claim 19, wherein the controlling circuitry is further configured to cause:

transmission of a beam selection measurement report to the transmitter apparatus for selection of the beam from the plurality of available beams.

21. The receiver apparatus of claim 19, wherein the controlling circuitry is configured to cause performance of beam selection measurements by causing determination of a quality metric for each of the beams of the set based on the beam selection measurements.

22. The receiver apparatus of claim 19, wherein the controlling circuitry is configured to cause performance of beam selection measurements by causing subjection of the number of received measurement signals to matched filtering based on the collection of linear combinations.

* * * * *